United States Patent [19]

Takagi

[11] 3,986,835

[45] Oct. 19, 1976

[54] VENTILATION HOOD FOR USE IN THE PREPARATION OF LABELLED COMPOUNDS

[75] Inventor: Masaru Takagi, Kamakura, Japan

[73] Assignee: Sinloihi Company Limited, Osaka, Japan

[22] Filed: May 13, 1975

[21] Appl. No.: 577,130

Related U.S. Application Data

[62] Division of Ser. No. 309,030, Nov. 24, 1972, Pat. No. 3,914,372.

[30] Foreign Application Priority Data

| | | |
|---|---|---|
| Nov. 27, 1971 | Japan | 46-94895 |
| Dec. 7, 1971 | Japan | 46-98302 |
| Oct. 2, 1972 | Japan | 47-97994 |
| Oct. 2, 1972 | Japan | 47-97995 |
| Oct. 3, 1972 | Japan | 47-98616 |

[52] U.S. Cl. .................................... 23/259; 23/292; 55/DIG. 9; 98/115 LH; 252/301.15

[51] Int. Cl.[2] ........................ B01L 5/00; B01L 5/02; B25J 21/02

[58] Field of Search .................. 23/252 R, 259, 292; 98/115 LH; 252/301.1 W, 301.15; 55/DIG. 9; 423/249, 580 H; 250/303, 304

[56] References Cited

UNITED STATES PATENTS

| | | | |
|---|---|---|---|
| 1,533,794 | 4/1925 | Failla | 23/259 |
| 1,609,614 | 12/1926 | Failla | 23/259 |
| 2,690,380 | 9/1954 | Taylor | 23/259 |
| 3,005,679 | 10/1961 | Yerzley | 23/259 |
| 3,080,307 | 3/1963 | Rinald | 23/252 R |
| 3,093,564 | 6/1963 | Weisman et al. | 23/252 R |
| 3,273,323 | 9/1966 | Whitfield | 55/DIG. 9 |
| 3,358,579 | 12/1967 | Hauville | 98/115 LH |
| 3,713,785 | 1/1973 | Moran | 23/259 |
| 3,764,266 | 10/1973 | Murakami | 23/252 R |

*Primary Examiner*—Morris O. Wolk
*Assistant Examiner*—Bradley R. Garris
*Attorney, Agent, or Firm*—Sughrue, Rothwell, Mion, Zinn and Macpeak

[57] ABSTRACT

In a hermetically sealed hood provided with recycle and recovery apparatus a labelled compound is obtained by adsorbing and releasing a gaseous radioisotope under vacuum in a reaction system incorporated with vials containing adsorbents thereby to bring said gas into contact with a compound to be labelled and to recover the gas remaining in the system by adsorbents or reacting agents, and removing a vial of products and a recovery vial of unreacted gases by sealing under vacuum. The gaseous radiosotope used in said preparation of the labelled compound is itemized (i.e. separated and collected) by applying the principle of adsorption and release and the removal by seal under vacuum mentioned above to capillary apparatus connected with said gas vial and a plurality of recovery vials.

9 Claims, 17 Drawing Figures

FIG.1
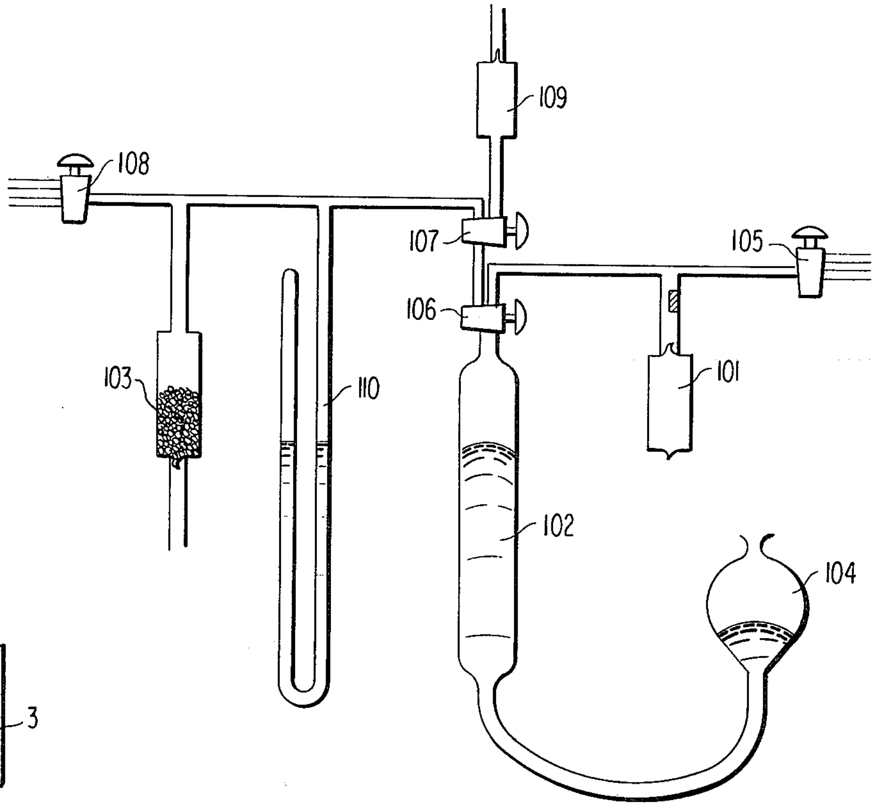
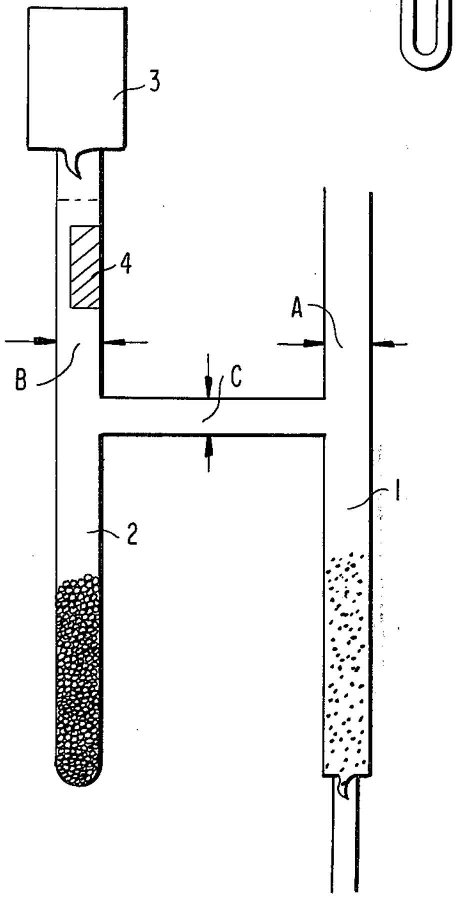
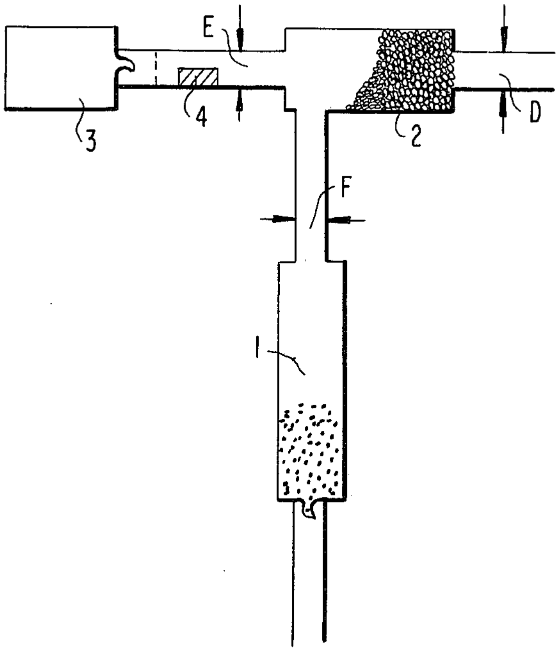
FIG.2
FIG.3

FIG.4
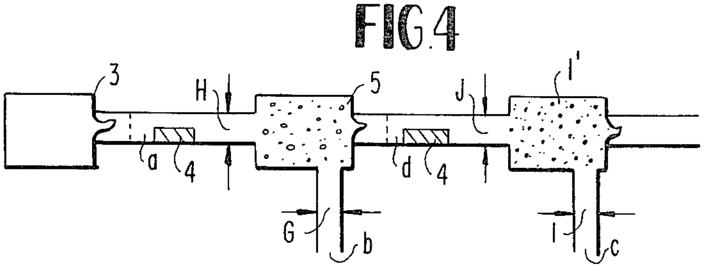
FIG.5
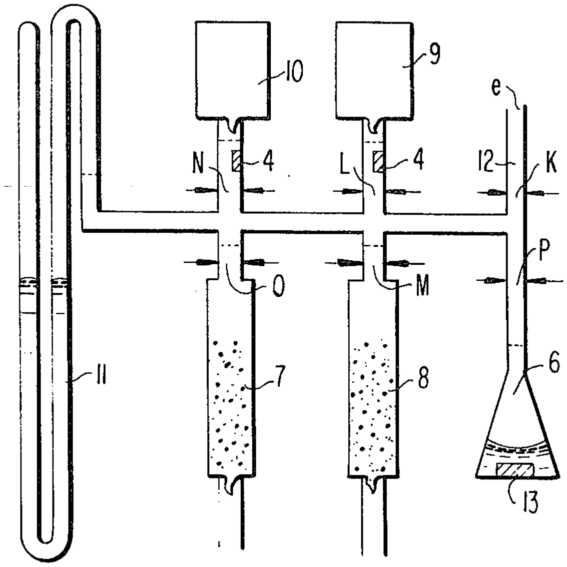
FIG.6
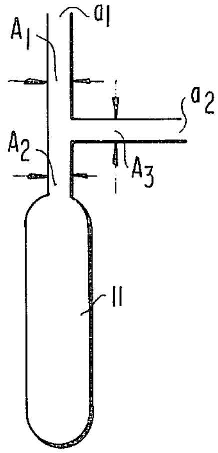
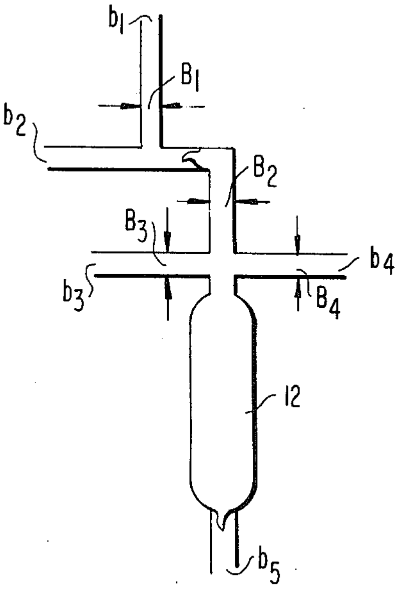
FIG.7
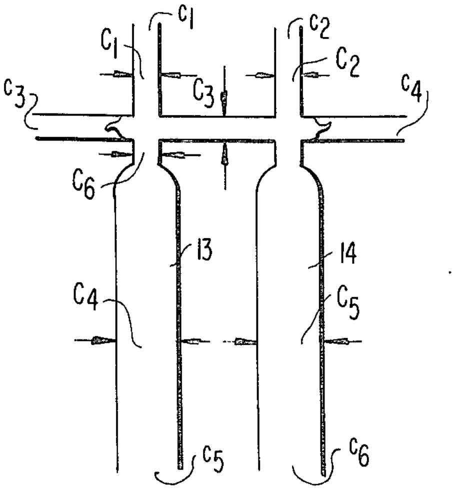
FIG.8

FIG. 9
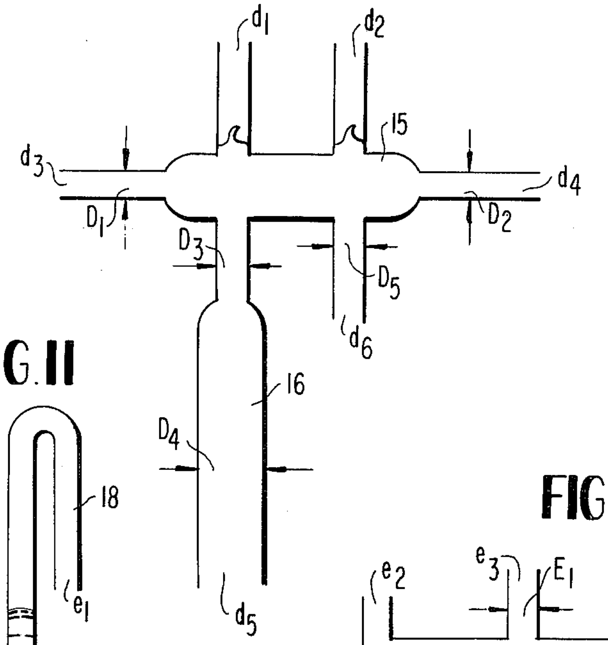
FIG. 10
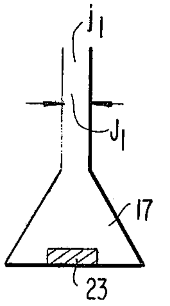
FIG. 11
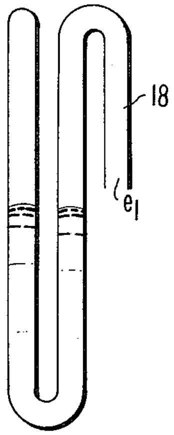
FIG. 12
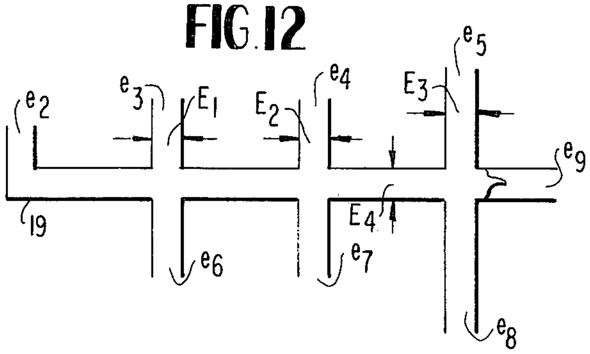
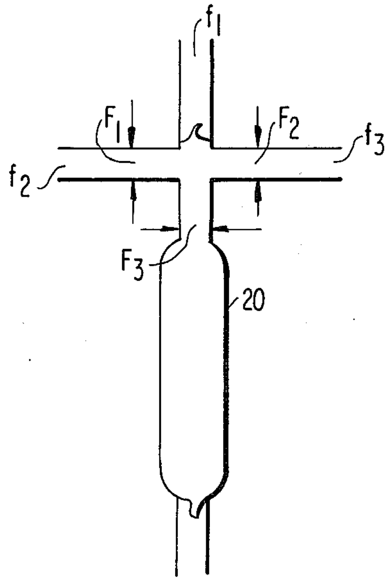
FIG. 13
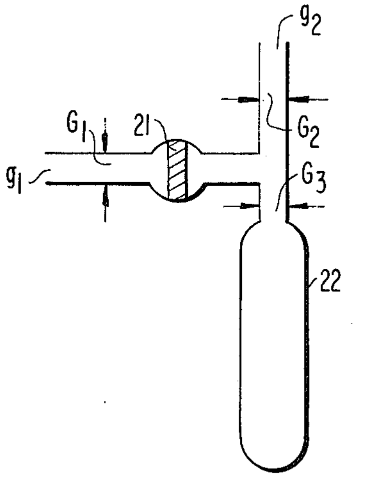
FIG. 14

FIG.15
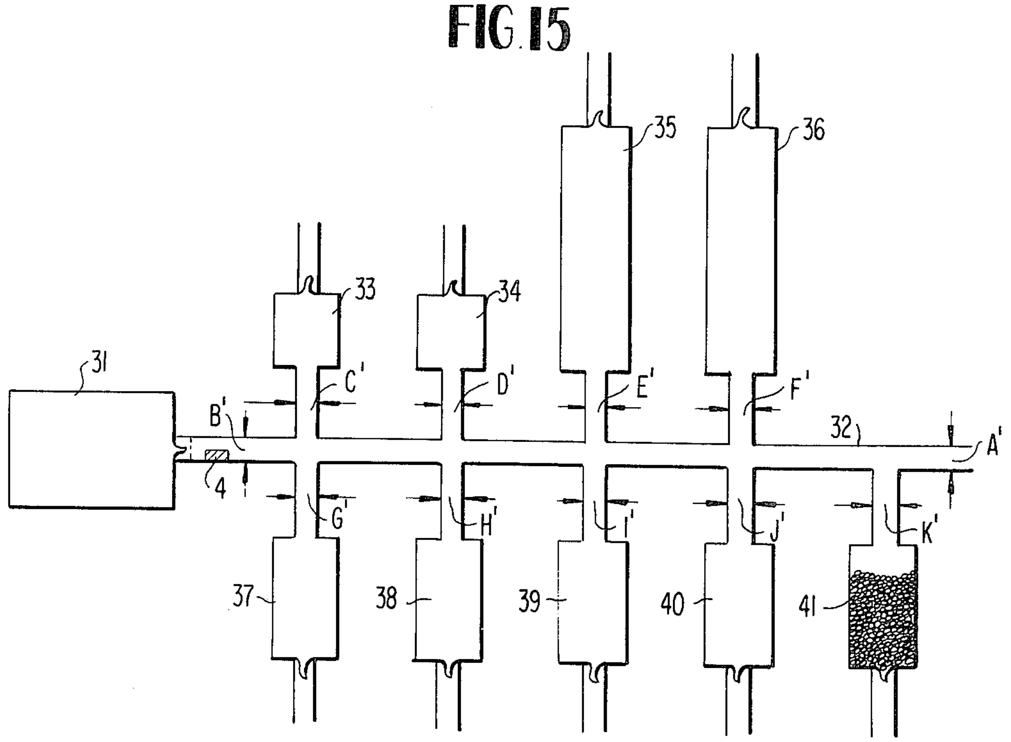
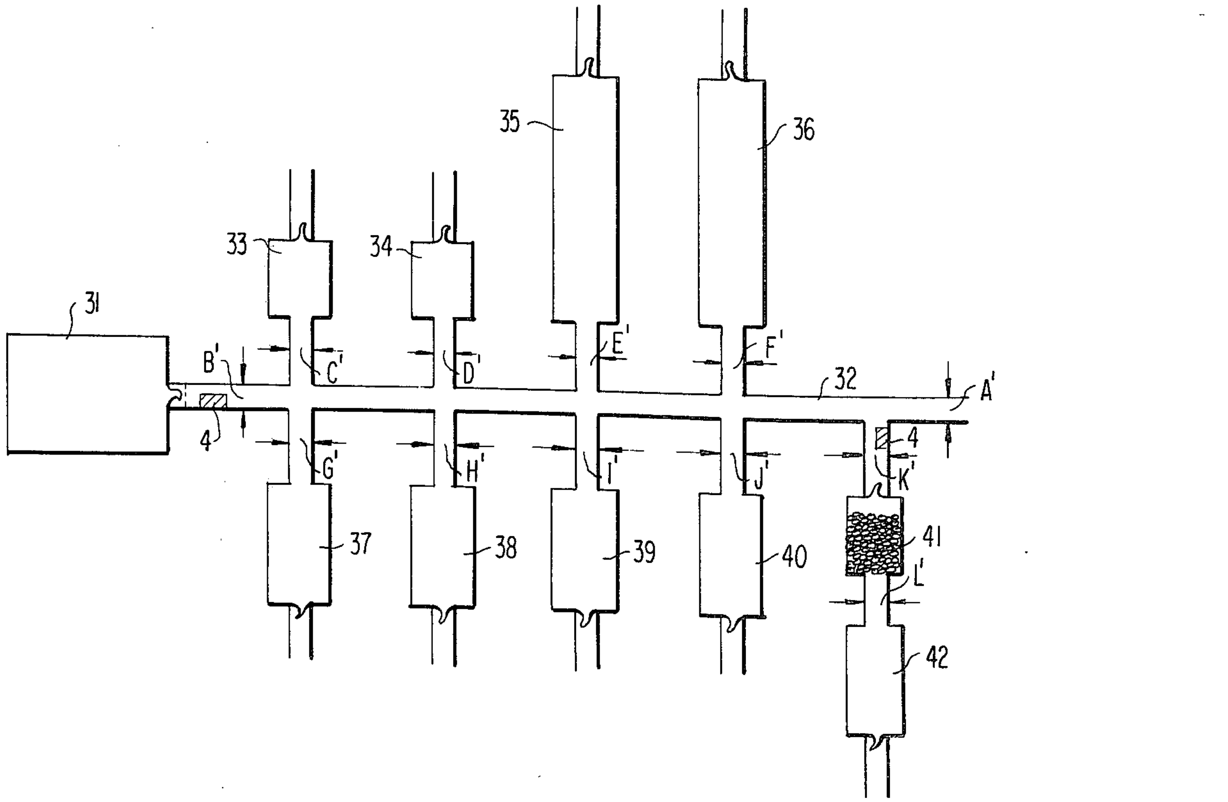
FIG.16

VENTILATION HOOD FOR USE IN THE PREPARATION OF LABELLED COMPOUNDS

This is a Division of application Ser. No. 309,030, filed Nov. 24, 1972, and now U.S. Pat. No. 3,914,372.

BACKGROUND OF THE INVENTION

The present invention relates to the preparation of a labelled compound and to the manipulation of a gaseous radiosotope in a double-sealed state.

Glass apparatus are used in general for sealing hermetically gaseous radioisotopes. However, with the conventional hoods the human body and environments would undoubtedly be contaminated by the leaking gaseous radioisotopes on breakdown of the glass apparatus. Accordingly, it is required that gaseous radioisotopes can be manipulated with use of an apparatus system sealed under vacuum and also such an apparatus system can be handled in a hood sealed hermetrically.

Labelled compounds are extensively being utilized as a tracer in the various fields such as physics and chemistry, medical science, biology, pharmacology, biochemistry, and industries. For preparing the labelled compounds there is a method utilizing an exchange reaction of hydrogen of a sample with tritium which takes place by β-ray of tritium. This method, being called a gas exposure method, includes enclosing a compound to be labelled and tritium gas within a container, allowing them to stand for a desired time and thereafter recovering tritium gas and producing a labelled compound. In addition to this method there are improvements of the gas exposure method, such as an electrical discharge method, catalytic method, irradiation method of ultraviolet ray, and radiation method, and a catalytic reduction method. It is well known that apparatus provided with Toepler's pump have hitherto been used for realizing these methods. However, such the prior art have the following disadvantages:

1. The attached instruments such as vacuum pump and exhaust pipes are contaminated by tritium.

2. By leakage of tritium absorbed on the innerside of apparatus and the instruments attached thereto a tritium concentration in the chamber increases and the workers are exposed to radiation.

3. Pollution of the atmosphere is caused by release of the air containing a high concentration of tritium from the exhaust port of laboratories.

4. A large-sized waste contaminated with tritium, such as disused apparatus, vacuum pump and other attached devices is generated.

5. When a broken out glass apparatus is repaired by meltsealing of glass, tritium adsorbed on the glass is generated in large quantities. There is a danger that tritium is generated in large quantities in the oil exchange of the vacuum pump.

6. It takes a long time for assembling the necessary apparatus. Particularly when a vacuum grease for fitting glass cocks is renewed, the gloves are contaminated because they come into contact with the grease contaminated by tritium. Also the contamination is extensively spread by touching other things with the contaminated gloves.

7. When apparatus, instruments attached thereto, hoods, and structures such as the floor and ceiling are contaminated by tritium, removal of the contamination requires a great deal of labor and expense.

8. The conventional method requires a large-sized hood because the apparatus to be used becomes large-sized.

9. Although it is necessary to elevate the reaction pressure for increasing a specific activity of the labelled compound and reaction efficiency, there is a limit as a matter of course in case of the apparatus with use of the Toepler's pump.

10. There is need to seal the cocks during the reaction because there is danger of tritium gas leaking therefrom. However when the gas pressure of the reactor is close to atmospheric pressure, it is difficult to seal the cocks.

11. When filtration is effected for removing the catalyst after completion of the catalytic reduction, tritium adsorbed on the catalyst is scattered in large quantities and therefore gives rise to radioactive exposure to the workers and pollution of the air in the chamber and outdoors.

On the other hand, tritium gas to be used as the preparation material of labelled compounds is economically advantageous to be purchased in an ampoule with large quantities. In many cases, for practical purposes tritium gas is manipulated in the form of several or several tens ampoules with small quantities separately. Therefore it is necessary to itemize the large quantities of tritium gas to the ampoules with small quantities. The apparatus with the Toepler's pump have hitherto been utilized for the itemizing operation. The method using such conventional apparatus has the disadvantages as in (1) to (8) mentioned hereinbefore.

Furthermore, it is necessary to increase safety that the apparatus of manipulating such gaseous radioisotope as tritium gas are used in a closed chamber. For this purpose systems having a glove-box, draft or hood provided with ventilation equipment have been hitherto used. According to these systems, the ventilation equipment is always operated under a semi-closed state or the particular treatment apparatus are provided in one-or multiple-plates between the ventilation equipment.

A treatment apparatus having high efficiency must be provided with to satisfy these systems. In some of the gaseous radioisotopes such apparatus are difficult to set up or become large-sized and expensive. In case of the treatment apparatus having low efficiency, when an accident happens, there is danger of the radioisotope gas with high concentration being diffused or scattered, as it is untreated, in and out of the laboratories. This is quite unsafe and therefore prohibited by laws. The exhaust gas below tolerance limits must be discharged.

On the other side, the gaseous radioisotope manipulating apparatus are usually operated in the glove box, hoods or drafts while ventilating the chamber directly or through treatment apparatus. At that time, for example, powdered substances often are scattered by the air pressure due to flowing of the gases. Such substances thereof must be manipulated without operating the ventilation equipment. Similarly, weighing by even balance is effected without operating the ventilation equipment. However this is sometimes accompanied by a very dangerous aspect because the radioisotopes are gradually accumulated.

In the conventional systems, thus, there are possibilities of the radioisotopes with high concentration being discharged through the ventilation equipment to the outdoors and the safety is maintained through dilution by diffusion of the exhaust gas into the atmosphere. In this connection the important problems are that the contamination of ducts leading from the ventilation equipment to the outdoors are accumulated and also the atmosphere is polluted. When ducts and the attached parts become obsolete, contamination in and out of the laboratories by them can not be disregarded. As particularly such a radioactive gas as tritium has a property of adhering or permeating to various things, it also becomes an issue. Accordingly, it is necessary to decrease the concentration of the radioisotope in the ducts during manipulation.

A main object of the present invention is to provide a system wherein gaseous radioisotopes can be safely manipulated with use of apparatus hermetically sealed under vacuum and particularly a double-closed system wherein such sealed apparatus can be also handled in a sealed chamber for increased safety.

Another object of the present invention is to provide a process for preparing safely and simply labelled compounds and apparatus to be used in carring out the same, which are applicable to the gas exposure method and its improvements such as electric discharge method, catalytic method, irradiation method of ultraviolet ray and radiation method or the catalytic reduction method, thereby overcoming all of the disadvantages of the prior art.

Further another object of the present invention is to provide a method for itemizing safely and simply a definite amount of gaseous radioisotopes.

Still another object of the present invention is to provide a closed system for handling a gaseous radioisotope manipulating apparatus in a closed state and discharging gases below tolerance limits to the outdoors.

SUMMARY OF THE INVENTION

An aspect of the present invention is directed to a process for the preparation of a labelled compound which comprises communicating a vial containing a compound to be labelled with an adsorbent containing vial through a glass tube, said two vials each being provided with at least one opening for connection, or providing a vial containing a mixture of the compound to be labelled and adsorbent with openings for connection, breaking in vacuum an ampoule of gaseous radioisotope connected to any one of the openings of the said vials to diffuse the gaseous radioisotope into a confined zone, adsorbing the diffused gas by the adsorbent under cooling, removing the said ampoule by melt-sealing, thereafter releasing the adsorbed gas by allowing the adsorbent to stand at room temperature or at an elevated temperature to bring the said gas into contact with the compound to be labelled thereby to obtain the labelled compound, recovering then the gas remaining in the confined zone by again cooling the adsorbent, and removing the vial containing the labelled compound by melt-sealing. Preferably, after the compound to be labelled was brought into contact with the gaseous radioisotope according to the above-mentioned process, the present invention includes the steps of providing an adsorbent or reacting agent containing vial for recovering the said gas separately, recovering the gas remaining in the confined zone by cooling or heating the said adsorbent or reacting agent and then removing the recovery vial by melt-sealing.

Also, the present invention may preferably include the step of communicating under vacuum a vial of a cleaning solvent with the labelled compound containing vial, establishing a temperature difference between these two vials to transfer the cleaning solvent thereby separating the labelled compound from unstable gaseous radioisotopes.

The catalytic reduction method according to the present invention includes steps of connecting a reaction vial containing compounds to be labelled and optionally a catalyst and solvent, a vial containing adsorbent for recovery of hydrogen, a vial containing adsorbent for recovery of tritium, a hydrogen gas ampoule and a tritium gas ampoule respectively to a glass tube, said vials and ampoules each being provided with at least one opening for connection and connected to the glass tube in such a way that one of said openings of the vials and ampoules each is communicated with the glass tube, breaking in vacuum said tritium gas ampoule to diffuse tritium gas into a confined zone, adsorbing the diffused gas by the adsorbent for tritium under cooling, removing the tritium gas ampoule by melt-sealing, thereafter releasing the adsorbed gas by allowing the adsorbent for tritium to stand at room temperature or an elevated temperature to bring the compounds to be labelled into catalytic reduction with the tritium gas, recovering an unreacted tritium gas remaining in the confined zone by again cooling the adsorbent, and then breaking in vacuum said hydrogen gas ampoule to diffuse hydrogen gas into the confined zone, reacting the hydrogen gas and recovering an unreacted hydrogen in the same operation as the case of tritium gas, and removing the reaction vial containing labelled compounds by melt-sealing.

Preferably, after the vial containing the unreacted tritium and the vial containing the unreacted hydrogen were removed by melt-sealing respectively according to the above mentioned process, the catalytic reduction method of the present invention is carried out by communicating in vacuum a solvent containing vial provided with a filter for recovery of the labelled compounds with the reaction vial, cooling the reaction vial to clean it with the solvent, and recovering the labelled compounds by the vial under cooling while removing the catalyst with the filter.

Apparatus to be used for conveniently carrying out the process according to the present invention comprises a combination of (i) a vial of a cleaning solvent provided with openings for connection, (ii) a vial of an adsorbent provided with openings for connection and a vial of a compound to be labelled provided with openings for connection, said two vials being communicated with each other by a glass tube, or a vial of a mixture of an adsorbent and compound to be labelled provided with openings for connection, and (iii) another vial of an adsorbent or reacting agent provided with connecting openings for recovery of a gaseous radioisotope. These vials or apparatus are combined and connected with one another conveniently to carry out the process of the present invention.

Also, apparatus to be used for carrying out the catalytic reduction method according to the present invention comprises a combination of (i) a reaction vial of a compound to be labelled and optionally a catalyst and solvent provided with openings for connection, (ii) a mercury manometer, (iii) a glass tube provided with openings for connection, (iv) a vial of an adsorbent provided with connecting openings for recovery of tritium gas, (v) a vial of an adsorbent provided with connecting openings for recovery of hydrogen gas, and (vi) a vial of a cleaning solvent provided with a filter for recovery of labelled compounds. These vials or apparatus are combined and connected with one another conveniently to carry out the catalytic reduction method according to the present invention.

Another aspect of the present invention, being the itemizing process of the gaseous radioisotope used for the preparation of the labelled compounds, comprises connecting a radioisotope gas ampoule to an end of a capillary tube, communicating a plurality of recovery vials for the radioisotope gas of which capacities may be the same or different respectively with the capillary tube, at least one of said recovery vials containing an adsorbent, breaking in vacuum said radioisotope gas ampoules to diffuse the gas into a confined zone, adsorbing the diffused gas by cooling said adsorbent, thereafter allowing said adsorbent to stand at room temperature or an elevated temperature to release the adsorbed gas into the zone, and removing the recovery vials by melt-sealing respectively thereby itemizing a definite amount of the radioisotope gas to the plurality of ampoules.

Alternatively, at least one of the plurality of recovery vials for tritium gas sealed in vacuum contains a reacting agent for converting tritium into tritiated water and is connected to the capillary tube in such a way that a breakable seal of the vial faces on the capillary tube. Itemizing is attained by breaking in vacuum a tritium gas ampoule to diffuse the gas into a confined zone, subdividing and recovering the diffused gas depending on the capacities of the recovery vials, removing the recovery vials by melt-sealing separately, thereafter breaking the breakable seal of said reacting agent containing vial, allowing the reacting agent to stand at room temperature or an elevated temperature, and cooling another vial communicated with the bottom of said reacting agent containing vial or any one of said recovery vials as a vial for collecting a reaction product thereby to collect the tritium gas remaining in the zone as tritiated water.

The production of the labelled compounds and the itemization of the gaseous radioisotope are preferably carried out in a particular hood provided with a treatment apparatus. A hood for the gaseous radioisotope manipulating apparatus according to the present invention comprises an operation box sealed hermetically under negative pressure containing the gaseous radioisotope manipulating apparatus therein, a ventilation box containing a treatment apparatus therein connected with said operation box, and a ventilation equipment connected with said ventilation box, said treatment apparatus being provided with means for recycling an escaping gaseous radioisotope containing fluid and means for recovering said gas, and said operation box being provided with a door leading to the upper part of the ventilation box.

Thus, even if the gaseous radioisotope leaks from the manipulating apparatus closed in vacuum, an extremely dilute gas below tolerance limits can be discharged to the outdoors. A fluid containing the gaseous radioisotope leaked from the manipulating apparatus is recycled through the operation box and the treatment apparatus while the gaseous radioisotope is recovered by the treatment apparatus, and then the door of the operation box leading to the upper part of the ventilation box is opened to exhaust a dilute gas stream below a tolerance limit through the ventilation equipment to the out doors. Also, according to the hood of the present invention, the gaseous radioisotope manipulating apparatus can be handled without ventilating the operating box.

Accordingly, the manipulation of the gaseous radioisotope, for example, in respect of the production of labelled compounds and the itemization of radioisotope gas becomes still more safe because of double-closed system.

BRIEF DESCRIPTION OF THE DRAWINGS

FIG. 1 is a schematic view showing the conventional apparatus for preparing labelled compounds with the use of Toepler's pump.

FIG. 2, FIG. 3, FIG. 4 and FIG. 5 each represents embodiments of apparatus to be used for carring out processes for the preparation of labelled compounds according to the present invention.

FIG. 6 represents a vial for cleaning solvents, FIG. 7 a vial for recovery of gaseous radioactive isotope, and FIG. 8 and FIG. 9 a reaction vial connected with a vial of an adsorbent through a glass tube. The vials set forth in FIG. 6 to FIG. 9 illustrate another embodiment of apparatus to be used in combination for carring out the process according to the present invention.

FIG. 10 represents a reaction vial of a compound to be labelled, FIG. 11 a mercury manometer, FIG. 12 a connecting glass tube, FIG. 13 a vial of an adsorbent for recovery of tritium gas and hydrogen gas, and FIG. 14 a vial of a cleaning solvent, provided with a filter for removal of a catalyst for recovery of labelled compounds. The vials set forth in FIG. 10 to FIG. 14 illustrate another embodiment of apparatus to be used in combination for carrying out the process of the present invention.

FIG. 15 represents an embodiment of an apparatus to be used for carring out a process for itemizing a gaseous radioisotope according to the present invention.

FIG. 16 represents a modification of the apparatus set forth in FIG. 15.

DETAILED DESCRIPTION OF THE INVENTION

Figure 17:
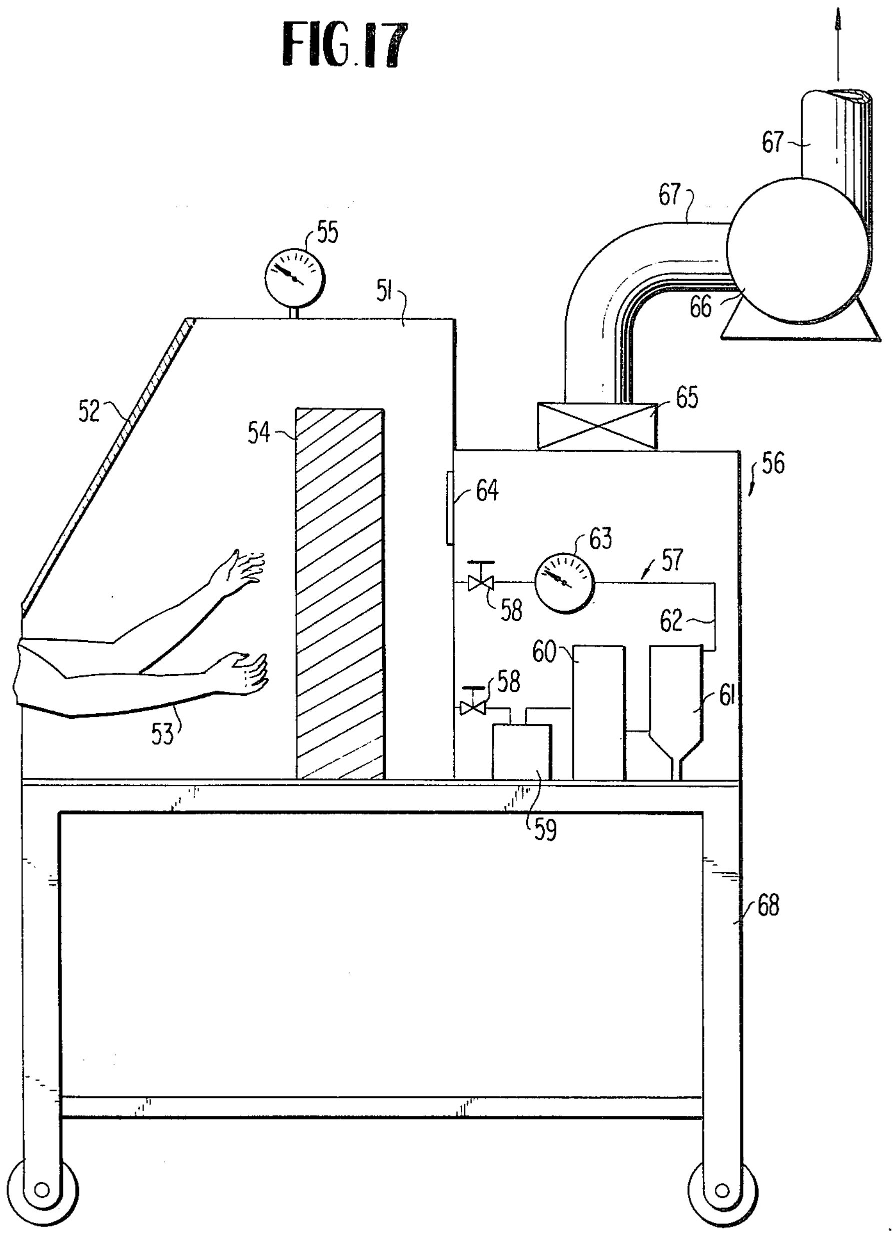
FIG. 17 represents a schematic sectional view of an embodiment of a hood for a gaseous radioisotope manipulating apparatus in a closed state according to the present invention.

It has been found that a labelled compound can be safely and simply obtained by adsorbing and releasing a gaseous radioisotope under vacuum with use of a confined reaction system incorporated with vials containing an adsorbent thereby to bring said gas into contact with a compound to be labelled and to recover the gas remaining in the confined system by an adsorbent or reacting agent, and removing a vial of products and a recovery vial of unreacted radioisotope gas by melt-sealing under vacuum.

Explaining in detail, the labelled compound is produced by communicating a vial containing a compound to be labelled provided with openings for connection to a vial containing an adsorbent provided with openings for connection through a glass tube, breaking in vacuum a radioisotope ampoule connected to any one of the openings of said vials to diffuse the gaseous radioisotope into a confined zone, adsorbing the diffused gas by cooling the adsorbent, removing said ampoule by melt-sealing, thereafter releasing the adsorbed gas by allowing the adsorbent to stand at room temperature or an elevated temperature to bring said gas into contact with the compound to be labelled thereby to obtain labelled compounds, adsorbing an unreacted gas remaining in the confined zone by again cooling the adsorbent, removing the recovery vial of said gas by melt-sealing, and removing the vial containing labelled compounds by melt-sealing.

In some cases, the radioisotope, particularly the gaseous radioisotopes exhibit behavior that is not in accordance with common sense in the radiation control. The gaseous radioisotopes have been manipulated in the conventional methods and apparatus without such points being made clear. The way that is at present conceived to be best is to manipulate the radioisotopes in a hermetically sealed apparatus system. The present invention is conveniently practised in the hermetically sealed system.

The operation of opening a vial by breaking its breakable seal with a magnet is herein referred to as mere "breaking" and melt-sealing by a gas burner is referred to as mere "melt-sealing". All of vials with openings for connection and connecting tubes used in the present invention are made of glass and the portions heated to a temperature of 480°C or more are made of quartz glass. Also, the portions used at a temperature below 480°C are preferably made of usual hard glass. The vials or tubes are connected by welding or by air-proof materials such as polyvinylchloride tubes.

Shapes and capacities of vials may be properly set up in accordance with the scale to be used. Preferably, openings for connection of vials and portions to be melt-sealed are glass tubes with outside diameter of lcm or less and inside diameter of 2mm~5mm.

Examples of the adsorbent used in the present invention include an active carbon, silicagel and alumina. In case the gaseous radioisotope is tritium, adsorbents such as titanium, zirconium, nickel, palladium, platinum, lithium, sodium, rubidium, cesium, calcium, strontium, erbium and uranium are also used. Examples of the reacting agents used for recovery of gaseous radioisotopes include copper oxide, platinum oxide and palladium oxide. These reacting agents are in general used to recover tritium as tritiated water which can be reused as the starting material.

The gaseous radioisotopes to be used include tritium, argon-37, krypton-85, gaseous labelled compound-C-14 and gaseous labelled compound S-35.

Alternatively, after the compound to be labelled was brought into contact with tritium gas according to the process of the present invention, the vial for recovery of tritium is filled with a reacting agent capable of reacting with tritium, such as copper oxide instead of the adsorbent such as the active carbon and furthermore connected in vacuum with another empty vial. Thus, tritiated water is produced by connecting the reacting agent containing vial with the adsorbent containing vial, communicating in vacuum said two vials with each other and collecting by said empty vial a reaction product obtained by heating the reacting agent as tritiated water. The recovered tritiated water can be used as the starting material for the labelled compound.

In the preferred embodiment of the present invention another vial for recovery of the gaseous radioisotope is provided in addition to the vial filled with the adsorbent. This is based on the following reason. There is need to reduce the volume of the confined zone as much as possible and increase the reaction gas pressure in order to raise a specific activity of the labelled compound and reaction efficiency. It may, therefore, be proposed to reduce the capacity of the adsorbent filled vial which is a part of the confined zone, but when the adsorbent filled vial is removed by meat-sealing to recover the gaseous radioisotope and stored at room temperature it is inevitable that the vial would be brought under pressure. Accordingly storing such a vial is attended with danger. For this reason it is preferred to provide an adsorbent or reacting agent filled vial for recovery of the gaseous radioisotope in addition to said vial.

Preferably, the vial containing the labelled compound produced by the process of the present invention is communicated in vacuum with a vial containing a cleaning solvent. The labelled compound is separated from unstable gaseous radioisotops by establishing a temperature difference between these two vials to transfer the cleaning solvent. The compounds labelled in the reaction vial are always accompanied by volatile tritium compounds produced by decomposition and unstable tritium. From the point of control of radioactive contamination it is necessary to remove the unstable radioactive substances when the apparatus system is still hermetically sealed. For this reason the reaction vial after completion of reaction is connected to a vial containing a cleaning solvent which has an affinity for tritium. The labelled compound can be safely removed from the system by repeating the heating and cooling to clean sufficiently the reaction vial. The cleaning solvent used for this purpose is preferable one having a low boiling point and dissociative hydrogen, such as water and alcohols.

To apply the present invention to the catalytic reduction method, a reaction vial containing compounds to be labelled and optionally a catalyst and solvent, a vial of the adsorbent for recovery of hydrogen, a vial of the adsorbent for recovery of tritium, a hydrogen ampoule and a tritium gas ampoule respective are connected to a glass tube. In this case the vials each are provided with openings for connection and connected to the glass tube in such a way that the openings are communicated with it. The compound to be labelled is reacted with tritium and then hydrogen to obtain labelled compounds under a hermetically sealed system. An unreacted tritium and hydrogen each are recovered and separated, and thus the reaction vial containing the labelled compounds is removed by melt-sealing.

The conventional apparatus for the preparation of a labelled compound is illustrated in FIG. 1. Toepler's pump 102 for transferring tritium gas is mounted in the center and connected to mercury chamber 104 with a polyvinylchloride tube. Tritium gas ampoule 101 provided with a magnet capable of breaking its breakable seal is mounted to the right of Toepler's pump, while a reaction vessel 103 with a desirable capacity is connected to the left. Three-way cocks 105 and 108 are connected to the right and to the left respectively to discharge or introduce the air. After all the air is purged from the apparatus, the breakable seal is broken by a magnet to release tritium gas. The gas is, then, transferred to a vial 103 containing a compound to be labelled by operating cock 106 and Toepler's pump 102. After the sample is brought into contact with tritium gas for a desired time, in reverse to the above center cock 106, three way cock 107 and Toepler's pump 102 are operated to transfer tritium gas into a recovery vial 109 which is then melt-sealed. Manometer 110 is to measure tritium gas pressure. The labelled compound is removed by introducing air from cock 108. It is required to effect all the operation mentioned above in a hood with high efficiency.

Examples of the apparatus used for carrying out the process of the present invention are illustrated by FIG. 2 and FIG. 3. Vial 1 provided with a breakable seal, containing an adsorbent is connected to vial 2 containing a compound to be labelled through a glass tube and an opening of any one of said two vials is connected with gaseous radioisotope ampoule 3. The connected portions are indicated in a dotted line. The opening is provided with piece of iron 4 to break a breakable seal of the ampoule 3. In case of reducing a capacity of the reaction vial as compared with that of the gaseous radioisotope, a higher reaction efficiency is easily attained due to a pressed condition.

A modification of the apparatus is shown in FIG. 4. Vial 5 provided with openings for connection of a gaseous radioisotope ampoule and vacuum pump, and a breakable seal is filled with a mixture of an adsorbent and compound to be labelled. Vial 1′ containing the adsorbent is to recover the gaseous radioisotope. Symbols A, B, C, D, E, F, G, H, I, and J each indicate portions to be melt-sealed.

Examples of the apparatus used for carrying out the catalytic reduction method according to the present invention are illustrated by FIG. 5. Reaction vial 6 containing a compound to be labelled, catalyst and solvent, tritium gas ampoule 9, hydrogen gas ampoule 10, an adsorbent containing vial 7 for recovery of hydrogen gas provided with a breakable seal and an adsorbent containing vial 8 for recovery of tritium gas provided with a breakable seal are connected to glass tube 12 respectively. Mercury manometer 11 is connected to an end of glass tube 12 and a vacuum pump to the other end *e*. Symbols K, L, M, N, O and P indicate portions to be melt-sealed.

The present invention can be conveniently carried out by using the apparatus set forth in FIG. 6 to FIG. 9. Vial 11 provided with openings $a_1$ and $a_2$ is one for a cleaning solvent. Vial 12 with openings $b_3$ and $b_4$, and a breakable seal provided with openings $b_1$ and $b_2$ is one for an adsorbent for recovery of a gaseous radioisotope. As shown in FIG. 8, vial 13 of a compound to be labelled provided with openings $c_1$ and $c_5$ is connected with vial 14 of an adsorbent provided with openings $c_2$ and $c_6$ through a glass tube. Furthermore, each of vials 13 and 14 is fitted with breakable seals having openings $c_3$ and $c_4$. Any one of openings $c_1$ and $c_2$ is connected to a gaseous radioisotope ampoule and the other to a vacuum pump. Vial 12 is to recover finally the unreacted gas remaining in the apparatus while vial 14 is a temporary rest-house wherein the gas adsorbed once is released. Further, a modification of the apparatus set forth in FIG. 8 is illustrated by FIG. 9 wherein vial 15 of a compound to be labelled provided with openings $d_3$, $d_4$ and $d_6$, and breakable seals each having openings $d_1$ and $d_2$ are communicated with vial 16 of an adsorbent having opening $d_5$ through a glass tube. In the drawings, alphabetical capital letters indicate portions to be melt-sealed and alphabetical small letters indicate openings for connecting with a vacuum pump and other vials. These vials or apparatus are connected with one another in a suitable combination to carry out the process of the present invention.

Furthermore, examples of apparatus used for carrying out conveniently the catalytic reduction method are set forth in FIG. 10 to FIG. 14. Symbol 17 is a reaction vial for filling a compound to be labelled, catalyst and solvent, symbol 18 a mercury manometer, symbol 19 a connecting glass tube, symbol 20 a vial for filling an adsorbent for recovery of tritium gas (the same vial as this being used for recovery of hydrogen gas), and symbol 22 a recovery vial of a labelled compound containing a solvent, provided with filter for removal of the catalyst. Alphabetical letters indicated in drawings are as defined above. These vials are connected with one another in a suitable combination to carry out the catalytic reduction method.

The present invention has the following advantages:

1. A radioisotope concentration in the working environment is reduced.
2. Radioactive exposure to workers by a radioisotope is reduced.
3. Pollution of the external environment by a radioisotope is reduced.
4. Contamination of attached apparatus by a radioisotope is reduced.
5. A large-sized waste contaminated by a radioisotope is not generated.
6. There is no contamination of a vacuum pump by a radioisotope.
7. When a vacuum grease is replaced, there is no contamination by a radioisotope because fitting glass joints and fitting glass cocks not at all used. Furthermore, as other portions are not brought into contact with a contaminated glove, no contamination overspreads.
8. As arrangement of reaction apparatus is unnecessary the work efficiency is raised.
9. As the apparatus used in the present invention are small-sized and convenient to handle, they can be manipulated in a small-sized glove box easy to seal (without the use of a large-sized hood).
10. The apparatus used in the present invention are disposable and also economical because such expensive apparatus as a particular vacuum line (particularly, fitting glass joints and cocks) are not at all used.
11. As the vials to be melt-sealed are always under vacuum the melt-sealing is easily effected.
12. It is possible to increase the tritium gas pressure in the reaction apparatus to elevate the reaction efficiency.

On the other side, itemizing the gaseous radioisotope can be conveniently carried out by connecting a plurality of recovery vials for the gaseous radioisotope of which capacities are the same or different to a capillary tube in such a way that the openings of said vials are communicated with the capillary tube respectively and connecting the gaseous radioisotope ampoule to an end of the capillary. In this case at least one of said recovery vials is filled with the adsorbent.

Alternatively, at least one of said recovery vials is filled with a reacting agent instead of the adsorbent. After tritium gas diffused in the confined zone was subdivided into the recovery vials and the connected portions were melt-sealed to remove the vials respectively, water tritiated can be produced by breaking in vacuum the vial filled with the reacting agent, allowing the reacting agent to stand at room temperature or an elevated temperature and reacting the reacting agent with tritium remaining in the confined zone. Water tritiated thus obtained can be used as materials. The reacting agent which reacts with tritium at room temperature or an elevated temperature to convert it to tritiated water includes metal oxides such as copper oxide, platinum oxide and palladium oxide.

As shown in FIG. 15 gaseous radioisotope ampoule 31 is connected to an end of glass tube 32 while a vacuum pump is connected to the other end of glass tube 32 and recovery vials 33 to 41 are communicated with the glass tube respectively. Ampoule 31 is broken in vacuum by piece of iron 4 and thus diffused gas is adsorbed on the adsorbent of vial 41 under cooling. After melt-sealing of connecting portion B′ the adsorbed gas is released to the confined zone by allowing the adsorbent to stand at room temperature or an elevated temperature and the gas is subdivided to the recovery vials in accordance with the capacity ratio. Connecting portions C′, D′, E′, F′, G′, H′, I′ and J′ are melt-sealed respectively. The gaseous radioisotope remaining in the capillary is adsorbed on the adsorbent by again cooling vial 41 and thereafter connecting portion K′ is melt-sealed.

Alternatively, as shown in FIG. 16, vial 41 connected with trap 42 is filled with a reacting agent instead of the adsorbent and connected to the glass tube 32 in such a way that the opening of vial 41 is communicated with the glass tube. When tritium gas ampoule 31 is broken in vacuum, tritium gas is immediately subdivided to each of vials and then connecting tube B′, C′, D′, E′, F′, G′, H′, I′ and J′ are melt-sealed respectively. After vial 41 was broken by piece of iron 4, trap 42 is cooled while vial 41 is heated, thereby tritium remaining in the confined zone being collected in trap 42 as tritiated water. After completion of recovery connecting tube L′ and then K′ are melt-sealed.

The itemizing process of the present invention has the advantages that tritium gas can be subdivided as tritiated water which is available as materials and that the subdivided amounts to each vial can be accurately determined by measurement of the amount of tritiated water and its radioactivity, in addition to the advantages (1) to (11) mentioned hereinbefore in respect of the process for the preparation of labelled compounds. Furthermore, it is clear that if tubes to be melt-sealed are of capillary it is easy for even those unskilled in glass work to melt-seal them.

On the other side, a hood for the gaseous radioisotope manipulating apparatus according to the present invention is characterized in that the gaseous radioisotope manipulating apparatus is always operated in an operation box maintained under negative pressure without ventilating and that the escaping gas is recycled through a treatment apparatus provided with recycle and recovery means therein to remove the radioisotope. According to this hood, a concentration of the gaseous radioisotope in the operation box is extremely reduced due to recycle of the gas stream, as compared with the conventional methods.

The treatment apparatus to be used is provided with a treating agent and treating means in accordance with the treating method as mentioned below.

| treating method | treating agent | treating means | radioisotope | recovered state |
|---|---|---|---|---|
| chemical oxidation | metal oxides (for example, $CuO$, $PtO_2$, $PdO$) | heating | tritium | water |
| electric combustion | | discharge | tritium | water |
| ordinary combustion | | combustion | tritium | combustion products |
| chemical and physical adsorption | metals such as titanium, zirconium, uranium and erbium | heating | tritium | solids |
| | activated charcoal, molecular sieve, silica gel etc. | normal temperature | radioisotope (liquid, gas) | solids |

The above mentioned treating methods may be used in combination in the treatment apparatus.

As shown in FIG. 17, operation box 51 provided with a radioisotope manipulating apparatus 54 therein is connected to ventilation box 56 provided with a treatment apparatus 57 for recycle and recovery therein. Furthermore, ventilation box 56 is connected with a ventilation equipment. Treatment apparatus 57 is provided with means for recycling a fluid containing a gaseous radioisotope and means for recovering the radioisotope. The gas diffused in operation box 51 is recycled through recovery apparatus 60, trap 61 and pipe 62 by recycle pump 59. Symbol 58 is a valve and symbol 63 a flow meter. The operation box, before operating, is sealed under negative pressure by opening door 64, driving the ventilation equipment, adjusting the pressure through pressure gauge 55 and then closing door 64. System comprising valve 58, pump 59, recovery apparatus 60, trap 61 and pipe 62 is, herein, referred to as treatment apparatus 57 for recycle and recovery. After the gaseous radioisotope was treated and recovered, door 64 of operation box 51 is opened to pass a fluid stream containing an extremely dilute gas below a tolerance limit through the upper part of ventilation box 56. The exhaust gas is then passed through filter 65 and discharged through exhaust ducts 67 to the outdoors by pump 66. Symbol 52 is a peep-window, symbol 53 operation-gloves, symbol 55 a pressure gauge and symbol 68 a table.

The operation box, treatment apparatus for recycle and recovery and ventilation equipment may be arranged by the available apparatus. The operation gloves used in the operation box may be substituted with mechanical hand. Preferably, box 56 is provided with gloves so that valve 58, pump 59, recovery apparatus 60, trap 61, pipe 62 and flow meter 63 can be operated by hand if desired. It is preferred to make trap 61 shape suitable for recovery scrap after treatment. Also, positions of the inlet and outlet at box 51 and ventilation box 56 are decided taking the work efficiency into consideration. Water conduits, gas conduits, drainpipes, wirings and pipings, and their fitting equipment may be provided, if desired, like the conventional drafts, hoods and gloveboxes. Materials of box 51 are not limited in kind so far as they are air-proof.

The hood, according to the present invention has the following advantages:

1. Even if the treatment apparatus is of small capacity, the treatment efficiency is remarkably increased by recycling it.

2. Even if a large amount of gaseous radioisotopes leak due to the apparatus accident, they are captured by the trap without directly scattering in the indoors and outdoors.

3. In connection with 1) it is not necessarily required to use a treatment apparatus with a high efficiency. A small-sized inexpensive apparatus can be used.

4. In the case of treatment of tritium gas, tritiated water with a high specific activity is obtained. Tritiated water can be reused as materials.

5. It is desirably viewed in the pollution preventive measure to recover the radioactive substances in the laboratories if possible, even when the content of radioactive substances to be exhausted is less than tolerance limits. From this point of view the hood of the present invention is effective.

The present invention is illustrated by the following examples, based on the drawings.

EXAMPLE 1

As shown in FIG. 2, 1g of salicylic acid was charged into vial 2 and 2g of a granulated active carbon dehydrated and degased by heating at 400°C under vacuum for an hour were charged into vial 1 of 8cc capacity. Magnet 4 was fixed within the opening of vial 2 and then a 10Ci tritium gas ampoule 3 itemized according to Example 13 set forth hereinafter was connected therewith through a polyvinyl chloride tube. The dotted line indicates the connected part. After a vacuum pump was connected to an opening of vial 1 and operated to make a pressure of the system $10^{-2}\sim10^{-3}$mmHg, portion A was melt-sealed by a gas burner. Then, a breakable seal of tritium gas ampoule was broken by magnet 4. Vial 1 was cooled by means of liquid nitrogen to allow the active carbon to adsorb the tritium gas diffused in the confined system. At that time a degree of vacuum of the system became $10^{-3}\sim\lambda$ $10^{-4}$mmHg. After completion of adsorption portion B was melt-sealed by a gas burner.

Next, the adsorbed tritium gases were completely released in the system when ceasing the cooling of the active carbon to make the system room temperature. After the system was allowed to stand at room temperature for 10 days, vial 1 was cooled again by means of liquid nitrogen to allow the active carbon to adsorb the remaining tritium gas, hydrogen gas and gaseous organic compounds produced by decomposition. At that time a degree of vacuum of the system became $10^{-3}\sim\lambda$ $10^{-4}$ mmHg. After completion of adsorption portion C was melt-sealed to separate the sample vial from the tritium gas vial and the tritium-labelled compound was removed.

A specific activity of radiochemically pure salicylic acid-H-3 obtained thus was 0.2mCi/g. The specific activity was measured by liquid scintillation spectrometer (made by Packard Co.). This is so with the following examples.

Tritium gas ampoule 1 recovered in the above procedure can be reused as tritium gas ampoule 3 as shown in FIG. 2 for preparing a labelled compound.

EXAMPLE 2

As shown in FIG. 3, vial 2 is filled with 200mg of salicylic acid and 200mg of platinum black as the catalyst while vial 1 was filled with 1g of a granulated porous titanium degased by heating at 700° to 800°C. Magnet 4 was fixed in an opening of vial 2 and ampoule 3 containing 1Ci tritium gas was connected to the opening with a polyvinyl chloride tube. The connected portion is indicated by a dotted line. A vacuum pump was connected to the other opening of vial 2 and then operated to make a degree of vacuum of the system $10^{-2}\sim10^{-3}$mmHg while heating vial 1 to a temperature of 600°C by the external electric furnace. Thereafter portion D was melt-sealed by a gas burner. A breakable seal of ampoule 3 is then broken by magnet 4. The temperature of the titanium was gradually reduced to allow the titanium to adsorb the tritium gas diffused in the system. At that time a degree of vacuum of the system became $10^{-3}\sim10^{-4}$mmHg. After completion of adsorption portion E is melt-sealed by a gas burner. Again, vial 1 was heated to temperatures of 700° to 800°C to release the adsorbed tritium gas into the system and the system was allowed to stand for 2 hours.

Thereafter, vial 1 is gradually cooled again to allow the titanium to adsorb the remaining tritium gas and hydrogen. At that time a degree of vacuum of the system became $10^{-3}\sim10^{-4}$mmHg. After completion of adsorption portion F was melt-sealed to separate the sample vial from the tritium gas vial and a tritium-labelled compound was removed.

A specific activity of a radiochemically pure salicylic acid-H-3 obtained thus was 1700mCi/g.

Tritium recovered in vial 1 practically was chemically adsorbed with the granulated porous titanium at normal temperature and converted to tritiated titanium. Therefore, vial 1 removed by melt-sealing could be treated as tritium disuse solids.

EXAMPLE 3

As shown in FIG. 4, 0.5g of digitoxin and 3g of a granulated active carbon dehydrated and degased by heating at 400°C under vacuum for an hour were fed to vial 5. Opening *a* of vial 5 in which magnet 4 is set up was connected to ampoule 3 containing 30 Ci tritium gas through a polyvinylchloride tube. The connected portion is indicated by a dotted line. After a vacuum pump was connected to opening *b* and then operated to make the system a degree of vacuum of $10^{-2}\sim\lambda$ $10^{-3}$mmHg, portion G was melt-sealed by a gas burner. Then, a breakable seal of tritium gas ampoule 3 was broken by magnet 4 and vial 5 was cooled by liquid nitrogen to allow the active carbon to adsorb the tritium diffused in the confined system. At that time a degree of vacuum of the system became $10^{-3}\sim\lambda$ $10^{-4}$mmHg. After completion of adsorption portion H was melt-sealed by a gas burner. When ceasing the cooling of the active carbon to make the system room temperature, the adsorbed tritium gases were completely released in the system and the system was allowed to stand at room temperature for 5 days.

Furthermore, another vial 1' for recovery of tritium gas of which opening *d* was provided with magnet 4 therein was filled with 3g of a granulated active carbon dehydrated and degased by heating at 400°C under vacuum for an hour. This vial was connected with vial 5 through a polyvinylchloride tube in such a way that its breakable seal was faced to opening *d*. The connected portion is indicated by a dotted line. Then, a vacuum pump was connected to opening *c* and operated to make a degree of vacuum of the system $10^{-2}$~λ $10^{-3}$mmHg, and thereafter portion I was melt-sealed by a gas burner. Next, a breakable seal of vial 5 was broken by magnet 4. Vial 1' was cooled by liquid nitrogen to allow the active carbon to adsorb the tritium gas diffused in the confined system. At that time a degree of vacuum of the system became $10^{-3}$~$10^{-4}$mmHg. After completion of adsorption portion J was melt-sealed by a gas burner to recover the remaining tritium gas and to obtain digitoxin-H-3.

A specific activity of radiochemically pure digitoxin-H-3 obtained thus was 210mCi/g.

EXAMPLE 4

As shown in FIG. 5, tritium recovery vial 8 and hydrogen recovery vial 7 each filled with 2g of an active carbon dehydrated and degased by heating at 400° C for an hour, mercury manometer 11, ampoule 10 containing 30ml hydrogen gas, ampoule 9 containing 10Ci tritium gas, and catalytic reduction vial 6 provided with magnetic stirrer 13, containing 0.1g of linolic acid, 50mg of a platinum black catalyst and 10 ml of dioxane were connected to capillary tube 12 respectively through polyvinylchloride tubes. The connected portions were indicated by the dotted line. Next, a vacuum pump was connected to opening *e* of the capillary and then operated to make a degree of vacuum of the system $10^{-2}$~$10^{-3}$mmHg while cooling catalytic reduction vial 6 by liquid nitrogen, and thereafter portion K was melt-sealed by a gas burner.

Subsequently, a breakable seal of ampoule 9 filled with 10Ci of tritium was broken by magnet 4. Tritium recovery vial 8 was cooled by liquid nitrogen to allow the active carbon to adsorb the tritium gas diffused in the confined system. At that time a degree of vacuum of the system became $10^{-2}$~$10^{-3}$mmHg. After completion of adsorption portion L was melt-sealed by a gas burner. Then, when vial 8 was brought to room temperature by ceasing the cooling, the adsorbed tritium gas was released completely in the system. After reaction vial 6 was brought to room temperature by ceasing the cooling, the reduction reaction of the compound to be labelled with tritium was carried out while agitating with magnetic stirrer 13. A reaction amount of tritium was read on by mercury manometer 11. After completion of reduction with tritium, tritium recovery vial 8 was cooled by liquid nitrogen to allow the active carbon to adsorb the unreacted tritium gas while cooling again the catalytic reduction vial by liquid nitrogen and then portion M was melt-sealed by a gas burner.

Subsequently, a breakable seal of ampoule 10 filled with 30ml of hydrogen was broken by magnet 4 and hydrogen recovery vial 7 was cooled by liquid nitrogen to cause the active carbon to adsorb the hydrogen gas diffused in the confined system. After completion of adsorption portion N was melt-sealed by a gas burner. Next, vial 7 was brought to room temperature by ceasing the cooling and consequently the adsorbed hydrogen gas was diffused in the system. After reduction vial 6 was brought to room temperature by ceasing the cooling, the reduction reaction with hydrogen was carried out to the saturation while operating magnetic stirrer 13. After completion of the reaction, vial 7 was cooled by liquid nitrogen to allow the active carbon to adsorb the unreacted hydrogen gas while cooling vial 6 by liquid nitrogen. At that time a degree of vacuum of the system became $10^{-3}$~$10^{-4}$mmHg. After completion of the adsorption portion O was melt-sealed by a gas burner. Moreover, portion P was melt-sealed to separate the catalytic reduction vial.

A specific activity of radiochemically pure stearic acid-H-3 obtained thus was 55Ci/g.

EXAMPLE 5

Acetic acid-C-14 was obtained by the sam procedure as Example 1 except that Grignard's reagent, $CH_3MgCl$ was reacted with carbon dioxide-C-14.

To compare the above Examples 1, 2, 3 and 4 of the present invention with cases according to the conventional method with the use of Toepler's pump, a tritium concentration in air of the working environment was measured during the operation by a tritium monitor. The measured results in average are shown in Table I.

Table I

| RUN NO. | Conventional method *1 | Present invention *2 |
|---|---|---|
| 1 (Example 1) | 2.5 × $10^{-6}$ μCi/cc | B.G. |
| 2 (Example 2) | 8.0 × $10^{-7}$ μCi/cc | B.G. |
| 3 (Example 3) | 5.0 × $10^{-6}$ μCi/cc | B.G. |
| 4 (Example 4) | 3.0 × $10^{-6}$ μCi/cc | B.G. |

*1 Amounts of tritium gas, a type and amount of a compound to be labelled compound, and reaction condition are the same as the cases of Examples 1 to 4 respective except the use of the conventional apparatus set forth in FIG. 1.
*2 B.G. means background.

Next, a comparison in a specific activity of the tritium labelled compounds between the present invention and the conventional method are shown in Table II.

Table II

| RUN NO. | Conventional method *3 | Present invention | Labelled compound |
|---|---|---|---|
| 5 (Example 1) | 0.23mCi/g | 0.20mCi/g | Salicylic acid-H-3 |
| 6 (Example 2) | 1,500mCi/g | 1,700mCi/g | Salicylic acid-H-3 |
| 7 (Example 3) | 185mCi/g | 210mCi/g | Digitoxin-H-3 |
| 8 (Example 4) | 55,000mCi/g | 55,000mCi/g | Stearic acid-H-3 |

*3 As defined in Table I.

EXAMPLE 6

In this example apparatus set forth in FIG. 6, FIG. 7 and FIG. 8 are used in combination with one another. Connecting portions of vials are preferably a capillary tube with the outside diameter of 8mm and inside diameter of 2mm.

To vial 13 shown in FIG. 8 through opening $c_5$ are charged 0.5g of salicylic acid and portion $C_4$ was melt-sealed as to make the inner volume of the vial 5ml. To vial 14 through opening $c_6$ are charged 2g of a granulated active carbon and portion $C_5$ was melt-sealed so that the inner volume of vial 14 except the bulk of the active carbon becomes 4ml. Next, an ampoule containing 20Ci tritium gas provided with an opening in which a magnet is fixed was connected with opening $c_1$ through a polyvinylchloride tube and a vacuum pump was connected to opening $c_2$. The active carbon was dehydrated and degased by heating at 450°C for 30 minutes while operating the vacuum pump, and after a degree of vacuum of the system became $10^{-2}$~λ $10^{-3}$mmHg, portion $C_2$ was melt-sealed.

Then, the tritium gas ampoule was broken by the magnet and the vial 14 with the active carbon was cooled by liquid nitrogen to allow the active carbon to adsorb the tritium gas diffused in the confined system. At that time a degree of vacuum of the system became $10^{-2}$~$10^{-3}$mmHg. After completion of adsorption portion $C_1$ was melt-sealed. When ceasing the cooling of the active carbon to make the system the room temperature, the adsorbed tritium gas was completely released in the system and brought into contact with salicylic acid at room temperature for 10 days.

Subsequently, to vial 12 shown in FIG. 7 through opening $b_3$ were charged 3g of a granulated active carbon and portion $B_3$ was melt-sealed so that the inner volume of vial 12 except the bulk of the active carbon becomes 10ml. The active carbon of vial 12 was dehydrated and degased by heating at 450°C for 30 minutes while operating a vacuum pump connected with opening $b_4$, and after a degree of vacuum of the system became $10^{-2}$~$10^{-3}$mmHg, portion $B_4$ was melt-sealed. Opening $b_2$ of vial 12 in which a magnet is fixed was connected with openings $c_4$ of apparatus 14 through a polyvinylchloride tube, and after a vacuum pump connected to opening $b_1$ was operated to make the system vacuum, portion $B_1$ was melt-sealed. Then, vials 12 and 14 was communicated with each other by breaking breakable seals and vial 12 of the active carbon was cooled by liquid nitrogen to cause the active carbon to adsorb the tritium gas diffused in the confined system.

At that time a degree of vacuum of the system became $10^{-2}$~$10^{-3}$mmHg. After completion of adsorption portion $B_2$ was melt-sealed and thus the tritium gas was recovered.

Next, portion $C_3$ was melt-sealed to separate vial 13 containing a product therein from vial 14. To vial 11 (FIG. 6) with opening $a_2$ in which a magnet is fixed were fed 20ml of methanol and opening $a_2$ was connected with opening $c_3$ of vial 13 through a polyvinylchloride tube. While cooling vial 11 by liquid nitrogen, a vacuum pump connected to opening $a_1$ was operated to make vial 11 and the connected portion vacuum, and thereafter portion $A_1$ was melt-sealed. Vial 11 was communicated with vial 13 by breaking its breakable seal and then brought into an elevated temperature while cooling vial 13, so that methanol was transferred into vial 13 to clean the product contained therein. Thereafter, methanol was recovered in vial 11 by warming vial 13 while cooling vial 11 and then portion $C_6$ was melt-sealed.

When the product, namely salicylic acid-H-3 was withdrawn from vial 13 in the glove-box, no diffusion of tritium gas into the glove-box could be practically perceived. A radiochemically pure salicylic acid-H-3 was obtained by purifying in the conventional procedure, its specific activity being 12mCi/g.

The manipulation of the vials and apparatus used in this example was made in the semi-closed California-form hood under ventilation, and a tritium concentration in air about the hood and exhaust was continuously monitored by the tritium monitor while working, its results always having indicated background.

In this example, the apparatus shown in FIG. 8 is intended to charge a compound to be labelled and an adsorbent into separate vials, respectively, but a vial for charging a mixture of a compound to be labelled and adsorbent, provided with connecting openings can be used to the same purpose. In the latter case, it is preferred to use such an adsorbent that the adsorbed gaseous radioisotope can be released at the normal temperature.

EXAMPLE 7

In this example apparatus set forth in FIG. 6, FIG. 7 and FIG. 9 are used in combination with one another.

To vial 15 (FIG. 9) with the inner volume of 12ml through opening $d_6$ was charged 1g of vitamin $B_2$ and portion $D_5$ was melt-sealed. To vial 16 through opening $d_5$ were charged 5g of a granulated active carbon and portion $D_4$ was melt-sealed so that the inner volume of vial 16 except the bulk of the active carbon becomes 10ml. Next, a magnet is fixed in an opening of an ampoule containing 50Ci tritium gas and the opening was connected to opening $d_3$ thrcugh a polyvinylchloride tube, and then while operating a vacuum pump connected to opening $d_4$ the active carbon was dehydrated and degased by heating vial 16 at 450° C for 30 minutes. When a degree of vacuum of the system became $10^{-2}$~$10^{-3}$mmHg, portion $D_2$ was melt-sealed. Then, the tritium gas ampoule was broken and vial 16 was cooled by liquid nitrogen to cause the active carbon to adsorb the tritium gas diffused in the confined system. At that time a degree of vacuum of the system became $10^{-2}$~$10^{-3}$mmHg. After completion of adsorption portion $D_1$ was melt-sealed. When ceasing the cooling of the active carbon to make the system the room temperature, the adsorbed tritium gas was completely released into the confined system in which the gas was then brought into contact with vitamin $B_2$ at room temperature for 5 days.

Subsequently, as mentioned in Example 6, vial 12 (FIG. 7) of 35ml capacity filled with 5g of an active carbon, prepared in advance was connected to opening $d_1$ (FIG. 9), and thus the tritium gas was recovered by vial 12 and then portion $D_3$ was melt-sealed.

The cleaning solvent vial 11 was connected to opening $d_2$ to remove the unstable tritium as mentioned in Example 6.

When the product, namely vitamin $B_2$-H-3 was withdrawn from vial 15 in the glove-box, no diffusion of tritium gas into the glove-box could be practically perceived. A radiochemically pure vitamin $B_2$-H-3 was obtained by purifying in the conventional procedure, its specific activity being 75mCi/g.

The manipulation of the vials and apparatus used in this example was made in the glove-box under ventilation. A tritium concentration in air about the glove-box and exhaust was continuously monitored by the tritium monitor while working, its results always having indicated background.

EXAMPLE 8

In this example apparatus set forth in FIG. 6, FIG. 7 and FIG. 8 are used in combination with one another as mentioned in Example 6 except that vial 12 is filled with a reacting agent instead of the active carbon and also another empty vial 11 is used for recovery of tritium.

After the tritium gas was brought into contact with salicylic acid in the same manner as Example 6, 30g of copper oxide, wire for elementary analysis were charged into vial 12 (FIG. 7) through opening $b_3$ and then portion $B_3$ was melt-sealed. The copper oxide was dehydrated and degased by heating at 450°C for 30 minutes while operating a vacuum pump connected to opening $b_4$ and portion $B_4$ was melt-sealed. Then, opening $b_5$ (FIG. 7) in which a magnet is fixed was connected to opening $a_1$ (FIG. 6) while a vacuum pump was connected to opening $a_2$ to make the system vacuum, and thereafter portion $A_3$ was melt-sealed. Next, opening $b_2$ (FIG. 7) in which a magnet is fixed was connected to opening $c_4$ (FIG. 8) through a polyvinylchloride tube while a vacuum pump was connected to opening $b_1$ to make the system vacuum and thereafter portion $B_1$ was melt-sealed. Subsequently, vial 12 was communicated with vial 14 by breaking the breakable seals while heating the copper oxide at a temperature of 450°C, and then vial 12 was broken to communicate with vial 11 which was connected to the bottom of vial 12. At that time vial 11 was cooled by dry ice to freeze and recover tritiated water obtained thus, a degree of vacuum of the system being $10^{-1}\sim10^{-2}$mmHg. Then portions $A_2$, $B_2$, and $C_3$ were melt-sealed to separate vial 11, vial 12, vial 13 and vial 14 from one another.

The removal of unstable tritium was made with the use of the solvent vial 11 in the same manner as Example 6.

When the product, namely salicylic acid-H-3 was withdrawn from the vial in the glove box, no diffusion of tritium gas into the glove-box could be practically perceived. Salicylic acid-H-3 having a specific activity of 11mCi/g was obtained by purifying in the conventional procedure.

The manipulation of the vials and apparatus used in this example was made in the semi-closed California-form hood under ventilation, and a tritium concentration in air about the hood and exhaust was continuously monitored by the tritium monitor while working, its results always having indicated background.

EXAMPLE 9

Acetic acid-C-14 was obtained by the same procedure as Example 6 except that Grignard's reagent, $CH_3MgCl$ is reacted with carbon dioxide-C-14.

EXAMPLE 10

Sulfuric acid-S-35 was obtained from $35SO_2$ in the same procedure as Example 6.

EXAMPLE 11

Apparatus set forth in FIG. 6, FIG. 7 and FIG. 9 are used in combination with one another.

In the same procedure as Example 6 except that 0.5g of digitoxin are used instead of 0.5g of salicylic acid, the digitoxin was brought into contact with tritium at room temperature for 5 days. Thereafter, 5g of a porous metallic titanium were charged into vial 12 of 10ml inner volume through opening $b_3$ and portion $B_3$ was melt-sealed. Then, the porous titanium was dehydrated and degased by heating at 700°C for 30 minutes while operating a vacuum pump connected to opening $b_4$, and when a degree of vacuum of the system became $10^{-2}\sim10^{-3}$mmHg, portion $B_4$ was melt-sealed. Next, opening $b_2$ in which a magnet is fixed was connected to opening $c_4$ (FIG. 8) through a polyvinylchloride tube while a vacuum pump connected to opening $b_1$ was operated to make the system vacuum, and thereafter portion $B_1$ was melt-sealed. Then, vial 12 was communicated with vial 14 by breaking the breakable seals, and the tritium gas diffused in the confined system was recovered as a tritiated titanium by heating the porous titanium to a temperature of 700° C and then lowering the temperature at a rate of 5°C per a minute. At that time a degree of vacuum of the system became $10^{-1}\sim\lambda$ $10^{-2}$mmHg and portion $B_2$ was melt-sealed, thus vial 12 filled with tritiated titanium being removed.

Subsequently, each of the vials was removed in the same procedure as Example 6. When digitoxin-H-3 was withdrawn from the vial in the glove-box, no diffusion of tritium into the glove-box could practically be perceived. A radiochemically pure digitoxin-H-3 was obtained by purifying in the conventional procedure, its specific activity being 85 mCi/g.

The manipulation of the vials and apparatus used in this example was made in the semi-closed California-form hood under ventilation, and a tritium concentration in air about the hood and exhaust was continuously monitored by the tritium monitor while working, its results having always indicated background. Furthermore, the tritiated titanium was considerably stable in the atmosphere and was treated as waste solids because of no release of tritium.

EXAMPLE 12

Vials and apparatus set forth in FIGS. 10, 11, 12, 13 and 14 are used in combination with one another.

5g of a granulated active carbon were charged into vial 20 (FIG. 13) of 20ml inner volume through opening $f_2$ and then portion $F_1$ was melt-sealed, and the active carbon was dehydrated and degased by heating at 450° C for 30 minutes while operating a vacuum pump connected to opening $f_3$, and when a degree of vacuum of the system became $10^{-2}\sim10^{-3}$mmHg, portion $F_2$ was melt-sealed. In this way, the same two vials filled with the active carbon for recovery of tritium and hydrogen respective are prepared.

To connecting tube 19 (FIG. 12) were connected said two vials filled with the active carbon, reaction vial 17 containing 0.1g of oleic acid, 30mg of a platinum black catalyst and 10ml of dioxane, mercury manometer 18, a 50Ci tritium gas ampoule and a 30ml hydrogen gas ampoule, respectively. At that time opening $J_1$ of vial 17 was connected to opening $e_8$ of tube 19, and opening $e_1$ to opening $e_2$, opening $f_1$ of vial 20 for recovery of tritium to opening $e_7$, opening $f_1$ of vial 20 for recovery of hydrogen to opening $e_6$, the 50Ci tritium gas ampoule to opening $e_4$, and the 30ml hydrogen gas ampoule to opening $e_3$, respectively. Opening $f_1$, tritium ampoule and hydrogen ampoule respective have a magnet fixed therein. Also the connections is conducted with polyvinylchloride tubes.

After a vacuum pump connected to opening $e_5$ was operated to make a degree of vacuum of the system $10^{-2}\sim10^{-3}$mmHg while cooling reaction vial 17 by means of the external liquid nitrogen, portion $E_3$ was melt-sealed. Then, the 50Ci tritium gas ampoule was broken and the active carbon was cooled by liquid nitrogen to adsorb the tritium gas diffused in the confined system. At that time a degree of vacuum of the system became $10^{-2}\sim10^{-3}$mmHg. After completion of adsorption portion $E_2$ was melt-sealed, and when ceasing the cooling of the active carbon to make the system room temperature, the adsorbed tritium gas was released into the system.

Next, reaction vial 17 was brought to room temperature by ceasing the cooling and the reduction reaction with tritium was carried out while agitating by magnetic stirrer 23. A reaction amount of tritium is read on by mercury manometer. When the tritium gas amount corresponding to 25Ci was consumed, the reduction reaction was ceased. Again the reaction vial 17 was cooled by liquid nitrogen while tritium recovery vial 20 was cooled to allow the active carbon to adsorb an unreacted tritium gas remaining in the system, and thereafter portion $F_3$ was melt-sealed.

Furthermore, the hydrogen gas ampoule was broken and a reduction reaction with hydrogen was carried out by the game procedure as the case of the reaction with tritium. In the same way portions $E_1$ (FIG. 12) and $F_3$ (FIG. 13) were melt-sealed to recover an unreacted hydrogen gas, and portion $E_4$ was melt-sealed to remove the vial 17 containing a reaction product.

Subsequently, a 30 ml dioxane containing vial of a 80 ml inner volume, provided with a glass filter (25mm in diameter, 3mm in thickness) for removal of the catalyst as shown in FIG. 14 is prepared in advance for recovery of a labelled compound. Opening $g_1$ (FIG. 14) was connected to opening $e_9$ (a magnet fixed therein) of the above mentioned vial 17 through a silicone rubber tube. While cooling vial 22 by liquid nitrogen, a vacuum pump connected to opening $g_2$ was operated to make the system vacuum and then portion $G_2$ was melt-sealed. Moreover, dioxane first was transferred into vial 17 by breaking opening $e_9$ with the magnet and cooling vial 17 while warming vial 22, and then the reaction product was recovered in vial 22 by inclining vial 22 while cooling to remove the catalyst with the glass filter 21. Then, portions $G_3$, $G_1$ and $J_1$ respectively were melt-sealed.

A radiochemically pure stearic acid-H-3 was withdrawn from the product recovery vial 22, its specific activity being 230Ci/g.

The manipulation of the vials and apparatus used in this example was made in the semi-closed California-form hood under ventilation, and a tritium concentration in air about the hood and exhaust while working was continuously monitored by the tritium monitor, its results always having indicated background.

In the conventional method with the use of Toepler's pump, in case of the use of 10 to 50Ci tritium gas, the tritium concentration in air within the room and about the exhaust was $1 \times 10^{-3}\mu Ci/ml$ to $1 \times 10^{-7}\mu Ci/ml$ because of the escaping gas from the apparatus while working.

According to the present invention, as set forth in the examples, there is practically no leakage of the gas from the vials or apparatus and also the labelled compound can be safely manipulated, thus the radiation exposure to the workers and radioactive contamination can be removed.

EXAMPLE 13

As shown in FIG. 15, vials 33 and 34 of a 4ml capacity each, vials 35 and 36 of a 16 ml capacity each, vials 37, 38, 39 and 40 of a 6 ml capacity each, and vial 41 of a 6 ml capacity filled with 4 g (2 ml) of an active carbon, respectively were connected to capillary tube 32 with polyvinylchloride tubes in such a way that openings of each vials are communicated with the capillary tube. Opening B' in which magnet 4 is fixed was connected to a 100Ci tritium gas ampoule 31 through a polyvinylchloride tube and a vacuum pump connected to opening A' was operated to make a degree of vacuum of the confined system $10^{-2}\sim10^{-3}$mmHg, and then portion A' was melt-sealed by a gas burner.

Then, a breakable seal of gas ampoule 31 was broken by magnet 4 and vial 41 was cooled by liquid nitrogen to allow the active carbon to adsorb the tritium gas diffused in the system. At that time a degree of vacuum of the system became $10^{-3}\sim10^{-4}$mmHg. After completion of adsorption portion B' was melt-sealed and when the system was brought into room temperature by ceasing the cooling of vial 41, the tritium gas adsorbed on the active carbon was completely released in the confined system. At that time the tritium gas was itemized in accordance with the volume ratio of each vials. After connected portions C', D', E', F', G', H', I', and J', respectively were melt-sealed, vial 41 again was cooled by liquid nitrogen to allow the active carbon to adsorb the tritium gas remaining in the system. After completion of adsorption, connected portion K' was melt-sealed by a gas burner. Finally, capillary tube 32 was melt-sealed in pieces and scrapped.

Thus, two ampoules of 5Ci tritium, five ampoules of 10Ci tritium and two ampoules of 20Ci tritium were obtained.

EXAMPLE 14

Krypton-85, argon-37 and carbon dioxide-C-14 were itemized in the same procedure as Example 13, respectively.

Thus, in every case, ampoules of 1Ci, 5Ci and 10Ci were obtained.

To compare Example 13 of the present invention with the conventional method, a tritium concentration in air of the working environment was measured during the operation by the tritium monitor. The measured results in average are shown in Table III.

Table III

| Conventional method *4 | Present Invention (Example 13) |
|---|---|
| $5.0 \times 10^{-6}$ $\mu$Ci/cc | B.G. |

*4 An itemizing method of tritium with use of Toepler's pump.

EXAMPLE 15

As shown in FIG. 16, vials 33 and 34 of a 10 ml capacity each, vials 35 and 36 of a 40 ml capacity each, vials 37, 38, 39, and 40 of a 20 ml capacity each, and vial 41 of a 10 ml capacity filled with 30g of copper oxide (CuO: an elementary analysis grade, degased by heating at a temperature of 45° C), respectively were connected to capillary tube 32, for example with polyvinylchloride tubes in such a way that opening of each vials are communicated with the capillary tube. Further, trap 42 is communicated with the bottom of vial 41.

Opening B' in which magnet 4 is fixed was connected to a 100Ci tritium gas ampoule 31, for example through a polyvinylchloride tube. After a vacuum pump connected to another opening A' was operated to make a degree of vacuum of the confined system $10^{-2}\sim\lambda$ $10^{-3}$mmHg, connected portion A' was melt-sealed. When a breakable seal of ampoule 31 was broken by magnet 4 to diffuse the tritium gas into the confined system, the tritium gas was immediately itemized in accordance with the volume ratio of each vials. Consequently, connected portions C', D', E', F', G', H', I', and J' were melt-sealed, respectively.

After a breakable seal of vial 41 filled with copper oxide was broken by magnet 4, vial 41 was heated to about 450°C by an electric heater while cooling trap 42 by dry ice, whereby the remaining tritium gas in the system was collected in tray 42 as tritiated water. At that time a degree of vacuum of the system became $10^{-2}\sim10^{-3}$mmHg. Thereafter, connected portions L', K', and then B' were melt-sealed.

Tritium gas ampoules 33, 34, 35, 36, 37, 38, 39 and 40 obtained thus were used as tritium feeds of 5Ci, 5Ci, 20Ci, 20Ci, 10Ci, 10Ci, 10Ci and 10Ci respectively for the preparation of a labelled compound. Furthermore, 9.4Ci of tritiated water, radiochemically almost pure were obtained.

In this example, another vial or trap 42 was communicated with the bottom of the vial filled with a reacting agent (vial 41) to capture the reaction product. Alternatively, any one or more of tritium recovery vials 33 to 40 are applied as a vial for capture of the reaction product so that tritiated water can be captured by cooling it in the same manner.

EXAMPLE 16

An operation of enclosing 100Ci of tritium gas in an ampoule filled with a compound to be labelled was made with use of the normal Wilzbach's labelling apparatus in operation box 51 (FIG. 17) of a 500 l inner volume closed under a negative pressure of $-60mmH_2O$ to the external pressure. After completion of the operation the tritium concentration in air of the operation box became 1.6$\mu$Ci/cm$^3$. This means that 800mCi of tritium gas was diffused in the box. The laboratory used herein is provided with a ventilation equipment having a ventilative capacity of 200m$^3$ per minute so that when discharging the exhaust gas at it is the average concentration during 8 hours about the exhaust is as follows:

$$\frac{8 \times 10^5\ (\mu Ci)}{200\ (m^3)/min. \times 10^6\ (cm^3/m^3) \times 60\ (min.) \times 8\ (hr.)} = 8.3 \times 10^{-6}\ \mu Ci/cm^3.$$

According to the laws concerning the prevention of radiation hazard due to radioisotopes, the maximum allowable concentration in average during 8 hours about the exhaust is $2 \times 10^{-7}\mu$Ci/cm$^3$. Therefore, the above exhaust gas must not be discharged to dilute as it is because the concentration is far exceeding the tolerance limit.

Accordingly, in the hood as set forth by FIG. 17 treatment apparatus 60 is provided with a quartz pipe of 20mm in inner diameter therein which was filled with 200g of CuO, wire for elementary analysis. A recycle stream with 25 l/min was fed through pump 59 while heating treatment apparatus 60 to a temperature of 450° C, and the recycle and treatment were carried on for 3 hours while tritiated water formed thus was captured by trap 61 of glass filled with a freezing mixture of dryice-methanol.

Then, the tritium concentration in air within the closed operation box 51 was measured by the ion chamber, its result being 0.006$\mu$Ci/cm$^3$ or 3mCi. In case that the remaining tritium gas of 3mCi was discharged to dilute with the ventilation equipment having the above-mentioned ventilative capacity, an average concentration during 8 hours about the exhaust was $3 \times 10^{-8}\mu$Ci/cm$^3$ so that the tritium gas with a concentration far less than the legal tolerance limits could be discharged to dilute.

Furthermore, the tritiated water captured with trap 61 was measured by the liquid scintillation spectrometer and counted, its result being 725mCi. 8.4ml of the tritiated water have a concentration sufficient for use as materials in the preparation of a labelled compound.

Additionally, a tritium concentration in air about the hood (FIG. 17) and within the laboratory was continuously monitored by the tritium monitor, its results having indicated background.

EXAMPLE 17

As apparatus of glass are in general used in the manipulation of tritium gas, in some cases the leakage of tritium gas due to their breakage is apprehended. This example was carried out under the assumption of such an accident.

An ampoule filled with 2Ci of tritium gas was broken in the operation box 51 used in Example 16 which was closed under a negative pressure of $-60mmH_2O$ and the tritium gas was diffused in the box, and as the result the tritium concentration in the box became 4$\mu$Ci/cm$^3$ based on calculation. For recovery and treatment of the leaked tritium gas, treatment apparatus 60 is provided with a glass pipe of 20mm in diameter therein which was filled with asbestos sprinkled with 10g of $PtO_2$. The recycle and treatment were carried on for 5 hours and thus formed tritiated water was captured in the same manner as Example 16. When a tritium concentration in the box became 0.0024$\mu$Ci/cm$^3$ or 1.2mCi, door 64 was opened to pass the gas stream through a ventilation equipment composed of filter 65, duct 67 and fan 66. A tritium concentration in average during 8 hours about the exhaust was $1.24 \times 10^{-8}\mu\lambda$ Ci/cm$^3$. Therefore, the gas with the concentration far less than the legal limit $2 \times 10^{-7}\mu$Ci/cm$^3$ could be discharged to dilute. Moreover, 8.1ml of a 1.9Ci tritiated water were recovered which are of course applicable as a material for the preparation of a labelled compound.

In addition, a tritium concentration in air about the hood (FIG. 17) wherein the leaked tritium is being recycled and treated and within the laboratory was continuously monitored by the tritium monitor, its results having indicated background.

EXAMPLE 18

Catalytic reduction vial 6 (FIG. 5) containing stearic acid-H-3 obtained in Example 4 was transferred to operation box 51 (FIG. 17) of a 50 l capacity, and the filtration for removal of the catalyst was carried out in a state closed under a negative pressure of $-60mmH_2O$ to the external pressure, and as the result an unstable tritium adsorbed on the catalyst diffused and therefor a tritium gas concentration in the box became 8$\mu$Ci/cm$^3$. This means that 0.4Ci of tritium gas leaked.

Within treatment apparatus 60 is provided a quartz pipe of 20mm in diameter wherein electrodes are set up and a relay is operated as to discharge at intervals of a second with the use of tesla coil. A recycle stream with 5 l/mi. was passed through the above treatment apparatus and the recycle and treatment were carried on for 3 hours while tritiated water formed thus was captured by trap 61 filled with a freezing mixture of dry ice-methanol. When a tritium concentration in the operation box became $1.6 \times 10^{-2}\mu Ci/cm^3$ or 0.8mCi, door 14 was opened to pass the gas stream through the ventilation equipment. A tritium concentration in average during 8 hours about the exhaust was $8.3 \times 10^{-9}\mu\lambda Ci/cm^3$, which was far less than the legal limit $2 \times 10^{-7}\mu Ci/cm^3$. Moreover, 2.4ml of a 396mCi tritiated water were recovered which are of course applicable as a material for the preparation of a labelled compound.

In addition, a tritium concentration in air about the hood wherein the leaked tritium is being recycled and treated and within the laboratory was continuously monitored by the tritium monitor, its results having indicated background.

EXAMPLE 19

To itemize sodium carbonate-C-14 with the use of a chemical balance placed within the closed operation box 51 of a 500 l inner volume the weighing of $100\mu Ci$ or 12mg was made with vibration spoon 10 times under a negative pressure of $-60mmH_2O$ to the external pressure. As the result there was no vibration of the balance due to the air pressure because of a calm state and furthermore, a surface contamination of the inside of the operation box according to the smear method after completion of the operation was measured by a liquid scintillation spectrometer, its results having practically indicated background.

Viewed in this light it may be concluded that there was practically no diffusion of the labelled compound into the operation box while working.

EXAMPLE 20

Examples 6 to 15 were repeated within the operation box 51 closed under a negative pressure as shown in FIG. 17 and as a result there were no troubles in manipulating the glass vials and apparatus under vacuum. The tritium gas was under a double-sealed state by the vacuum-sealed vial or apparatus and also the closed operating box so that the workers could manipulate the tritium with safety. Further, a tritium concentration in air about the hood and within the laboratory was continuously monitored by the tritium monitor and as the result there was no leakage of tritium at all.

What I claim is:

1. Hood apparatus for manipulating gaseous radioisotopes such as tritium which comprise an operation box means sealed hermetically under a negative pressure, a ventilation box means connected to the operation box means, door means connected between said operation box means and said ventilation box means, gaseous radioisotope manipulating apparatus fixed within the operation box means, radioisotope treatment apparatus fixed within the ventilation box means and connected to the operation box means, said treatment apparatus including means for recycling a fluid stream to the operation box means, said treatment apparatus also including means for recovering an escaping gaseous radioisotope.

2. The hood apparatus of claim 1, wherein said means for recovering the escaping gaseous radioisotope includes a vessel means containing a reagent capable of reacting with tritium to form tritiated water, and trap means for capturing the tritiated water.

3. The hood apparatus of claim 1, wherein said means for recovering the escaping gaseous radioisotope includes a vessel means containing a reagent capable of reacting with tritium to form tritiated water, said reagent being a member selected from the group consisting of copper oxide, platinum oxide, and palladium oxide, and trap means for capturing the tritiated water.

4. The hood apparatus of claim 1, wherein said means for recovering the escaping gaseous radioisotope comprises a vessel containing adsorbent.

5. The hood apparatus of claim 1, wherein said means for recovering the escaping gaseous radioisotope comprises a vessel containing a metal absorbent selected from the group consisting of titanium, zirconium, erbium and uranium.

6. The hood apparatus of claim 1 wherein said means for recovering the escaping gaseous radioisotope comprises a vessel containing an absorbent selected from the group consisting of active carbon, molecular sieve and silica gel.

7. The hood apparatus of claim 1, wherein said means for recovering the escaping gaseous radioisotope includes an electric discharge device for oxidation of tritium, and trap means for capturing the tritiated water produced by said electric discharge device.

8. The hood apparatus of claim 1, wherein said gaseous radioisotope manipulating apparatus includes means for the preparation of a labelled compound from a gaseous radioisotope and a compound to be labelled which comprises (i) a vial of a cleaning solvent provided with openings for connection, (ii) a vial means of an adsorbent provided with openings for connection and a vial of a compound to be labelled provided with openings for connection, said two latter vials being communicated with each other by a glass tube, or a vial of a mixture of an adsorbent and compound to be labelled provided with openings for connection, and (iii) another vial means of an adsorbent or reacting agent provided with connecting openings for recovery of a gaseous radioisotope.

9. The hood apparatus of claim 1, wherein said gaseous radioisotope manipulating apparatus includes means for the preparation of a labelled compound from a gaseous radioisotope and a compound to be labelled which comprises (i) a reaction vial means of a compound to be labelled and optionally a catalyst and solvent provided with openings for connection, (ii) a mercury manometer, (iii) a glass tube provided with openings for connection, (iv) a vial of an adsorbent provided with connecting openings for recovery of tritium gas, (v) a vial of an adsorbent provided with connecting openings for recovery of hydrogen gas, and (vi) a vial of a cleaning solvent provided with a filter for recovery of labelled compounds.

* * * * *